Figure 1:
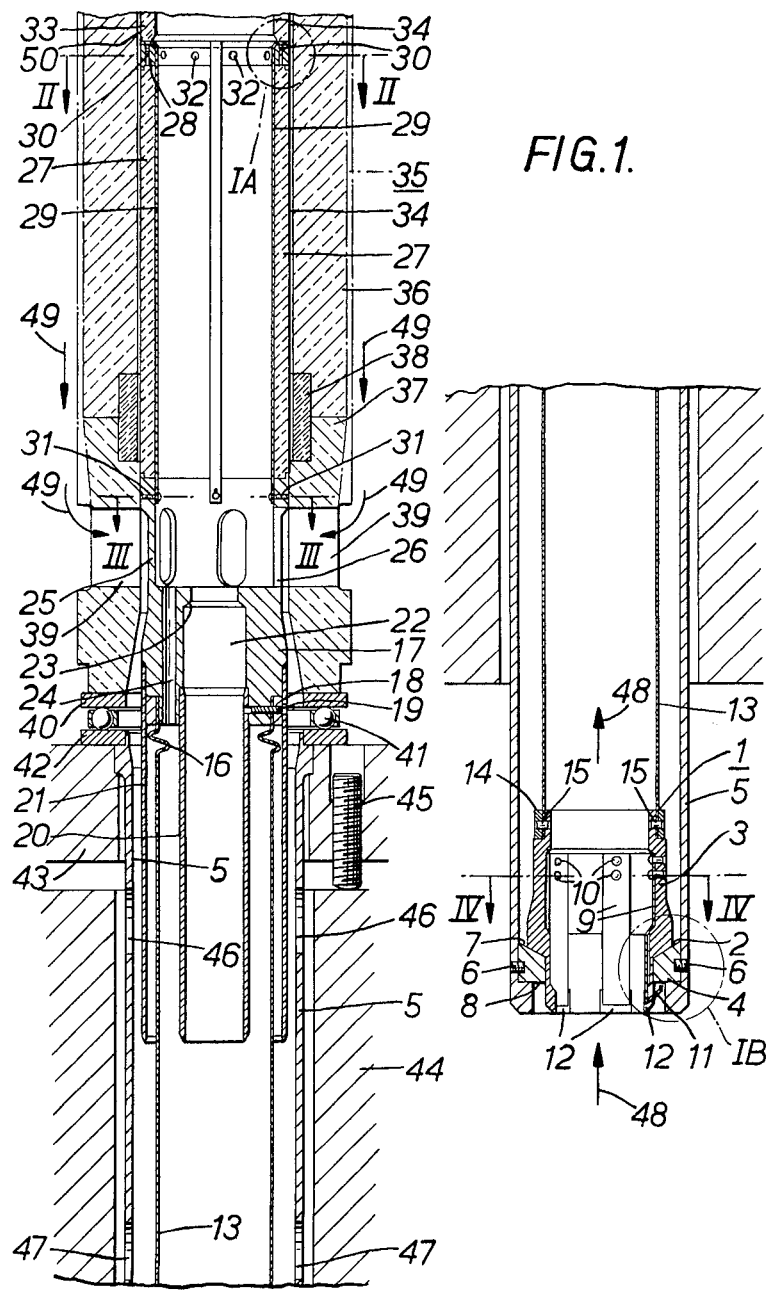

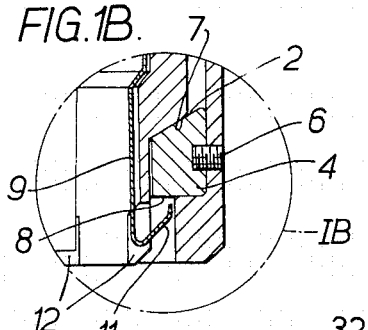
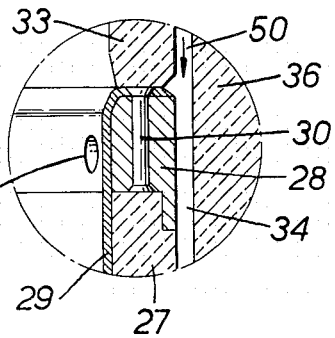
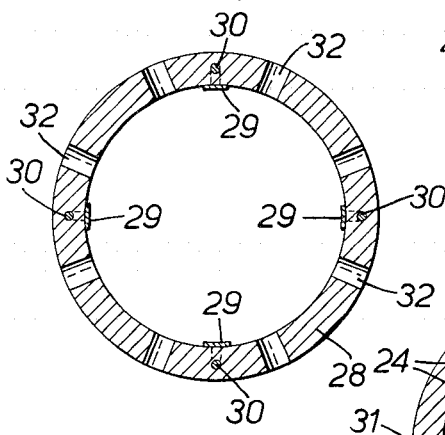
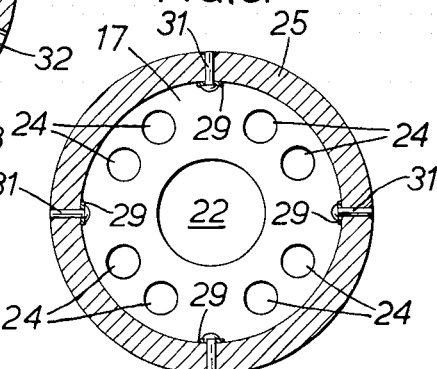
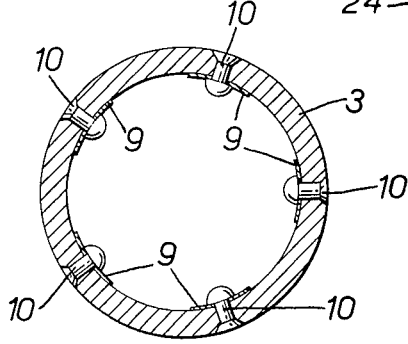

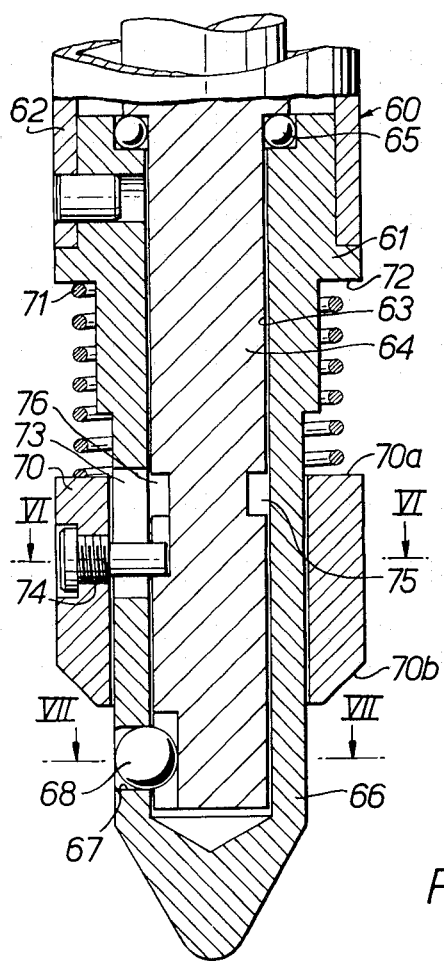
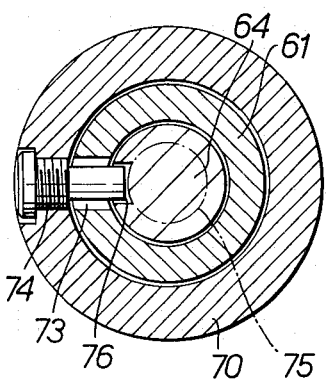
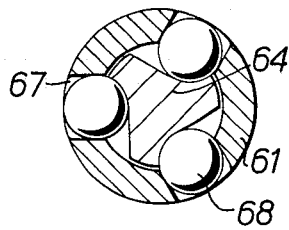
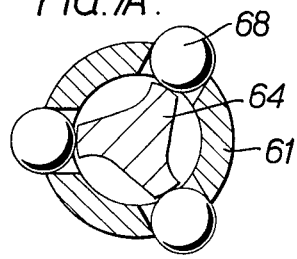

United States Patent Office 3,240,676
Patented Mar. 15, 1966

3,240,676
NUCLEAR REACTOR INCLUDING ENERGY DISSIPATION DEVICE FOR FALLING BODIES
Gordon Brown, Wigan, and Arthur Firth, Altrincham, England, assignors to United Kingdom Atomic Energy Authority, London, England
Filed Apr. 16, 1962, Ser. No. 187,507
Claims priority, application Great Britain, Apr. 25, 1961, 14,992/61
5 Claims. (Cl. 176—43)

This invention relates to energy dissipation devices suitable for use in a nuclear reactor to dissipate energy from a falling body such as a control rod or fuel element to prevent the creation of excessive impact forces in the falling body.

It is customary for an energy dissipation device to be located at the bottom of a channel in a reactor in a manner such that it can be easily removed and replaced once it has been used. British patent specification No. 783,094, for example, shows such a device slidably located in a boss. However, with the advancement of nuclear reactor design, higher velocities of coolant flow are being used and reactors are designed to be refuelled during operation. The need then arises to locate energy dissipation devices so that they cannot be removed by the drag of coolant flow. This implies the provision of a latch, which in turn implies the design of a latch which has a very high degree of reliability with the duty of holding a large coolant drag force (typically 300 lbs.) over a confined diameter (typically 5") and the design of a tool to operate the latch. These last two requirements in combination are difficult to meet: the latch must always be releasable (as otherwise a channel in the reactor could be rendered unusable) and the tool must be operable by remote manipulation and without direct vision.

According to the invention an energy dissipation device for a nuclear reactor has a latch capable of holding the device against displacement out of the reactor by coolant flow through the reactor, the latch having two parts one engageable with the other, one part attached to the device and the other attached to the reactor structure, the latch having the characterising feature that the parts are readily engageable one with the other by elastic deformation and the latch is disengageable only by stressing the latch until the part attached to the device deforms plastically to release the latch whilst the part attached to the reactor structure remains undeformed.

By way of example, an energy dissipation device according to the invention will now be described with reference to the accompanying drawings in which:

FIGURE 1 is a sectional elevation, the upper and lower portions being shown side by side, FIGURES 1A and 1B are enlarged views of the parts of FIGURE 1 enclosed by the chain dotted circles 1A and 1B respectively, FIGURE 2 is a section on the line II—II of FIGURE 1, FIGURE 3 is a section on the line III—III of FIGURE 1, and FIGURE 4 is a section on the line IV—IV of FIGURE 1, FIGURE 5 is a fragmentary side view, partly in section of a special tool, FIGURES 6 and 7 are sections on the lines VI—VI and VII—VII thereof, and FIGURE 7A is similar to FIGURE 7 but with parts displaced.

FIGURES 1 to 4 show an energy dissipation device 1 in the core of a gas-cooled, graphite-moderated nuclear reactor (of the type described in the article "The A.G.R." appearing in the April 1961 issue of the publication "Nuclear Engineering"), the device 1 having a latch 2 capable of holding the device 1 against upward displacement out of the reactor by coolant flow through the reactor core. The latch has two parts 3, 4, one engageable with the other, the part 3 being attached to the device 1 and the part 4 being attached to a tube 5 forming part of the structure of the reactor.

The part 4 is in the form of a ring secured to the tube 5 by four equi-spaced screws 6, the screws 6 being welded to the outer wall of the tube 5 after they have been screwed into position. The part 4 has a conical upper face 7 and a horizontal lower face 8. The part 3 is in the form of a sleeve having five equi-spaced spring hook members 9 of stainless steel. Each of the fingers 9 is secured at its upper end to the part 3 by two rivets 10 and has at its lower end of its shank portion an upwardly and outwardly turned end or "point" portion 11 which passes through a slot 12 in the part 3.

The device 1 further comprises a collapsible tube 13 of stainless steel which is secured at its lower end to the part 3 by a clamping ring 14 and screws 15. The tube 13 is of 3.9 ins. outside diameter and has a wall thickness of .036 in. The tube 13 has a pre-formed corrugated portion 16 adjacent its upper end and is secured at its upper end to a tubular support member 17 by a clamping ring 18 and screws 19. The member 17 has welded to it an inner former tube 20 and an outer shroud tube 21. The member 17 has a central passageway 22 having at its upper end a conical face 23 and eight vertically-orientated passageways 24 are spaced round the passageway 22 (to show this arrangement more clearly one of the passageways 24 has been shown out of position in FIGURE 1). The member 17 also has an integral support sleeve 25 having five equi-spaced ports 26. A graphite sleeve 27 is keyed at its lower end to the sleeve 25 and is keyed at its upper end to a steel impact ring 28. Four equi-spaced steel straps 29 are each secured at their upper end to the ring 28 by a rivet 30. The straps 29 extend vertically over the inner face of the sleeve 27 and are each secured at their lower end to the sleeve 25 by a rivet 31 (the sleeve 25 and the member 17 are made of steel). The ring 28 has eight equi-spaced ports 32.

A fuel element cluster of the type disclosed in British patent specification No. 873,073 and having an outer graphite sleeve 33, inside which fuel rods are housed, rests on the ring 28. The sleeves 27, 33 and the member 17 are housed in a channel 34 formed in a column 35 (the column 35 being one of many similar columns stacked side by side to form the moderator structure of the nuclear reactor) comprising superimposed graphite blocks 36. Each column of blocks 36 is supported by a single block 37 supported in turn by a steel plate 40. The blocks 36, 37 are keyed together at their adjacent ends by a graphite ring 38. The blocks 36 are keyed together in a similar manner. The block 37 has four equi-spaced ports 39 at the level of the ports 26 in the sleeve 25 and the plate 40 is mounted on a ball race 41 resting on a steel plate 42. The plate 42 is located by the upper end of the tube 5 on a main support plate 43 carried by a diagrid 44, levelling screws 45 being provided to enable the plate 43 to be adjusted to a level position. The tube 5 is carried at its upper end by the plate 43 and has two sets of ports 46, 47.

The device 1 is originally installed in the reactor under "off-load" conditions and is installed by assembling together the member 17, the tubes 13, 20 and 21, and the member 3 and lowering the assembly into the tube 5. When the hook members 9 of the part 3 meet the face 7 of the part 4 they are deflected inwardly under elastic deformation to allow the further lowering of the assembly until the position shown in FIGURE 1B is reached wherein the point portions 11 of the hook members 9 pass through the slots 12 with a small clearance from the face 8 of the part 4. The face 7 serves to centralise the device 1 in the tube 5. The fuel element cluster is then lowered into the reactor until the sleeve 33 rests on the ring 28. The weight of the fuel element cluster (270 lbs.), the sleeve 27 and the device 1 is transmitted through the member 4 to the tube 5 and through the tube 5 to the plate 43 and thus to the diagrid 44.

Under "on-load" conditions coolant gas enters the reactor above the moderator structure to divide into two fractions, a first fraction passing downwardly over the peripheral walls of the moderator structure to be deflected to flow upwardly through the device 1 (and the other similar devices associated with the other columns of the moderator structure) as indicated by arrows 48, and a second fraction a part of which passes downwardly between the columns of the moderator structure as indicated by arrows 49, and another part of which passes downwardly through the annular paths between the fuel element clusters and the walls of the channels housing them as indicated by arrows 50 in the annular path between the sleeve 33 and the wall of the channel 34. The coolant flowing as indicated by the arrows 50 passes through the ports 32 in the ring 28 to flow upwardly over the fuel rods housed inside the sleeve 33, and the coolant flowing as indicated by the arrows 49 passes through the ports 39, 26 to flow upwardly through the sleeves 27, 33. The coolant flowing as indicated by the arrow 48 flows upwardly through the tube 13 and passes through the passageways 22, 24 to flow upwardly through the sleeves 25, 27, 33.

When it is required to remove the fuel element cluster from the channel 34 a grab is lowered into the channel 34 to engage the fuel element cluster which is then withdrawn upwardly. Should the cluster inadvertently drop during removal it falls and strikes the impact ring 28. The impact force can be as great as 20,000 lb. and this is absorbed by the progressive collapsing of the tube 13 which collapses by corrugating along its length in the manner indicated by the preformed corrugated portion 16. The former tube 20 assists in centralising the collapsed tube 13 and the shroud tube 21 controls the outer diameter of the collapsed tube 13 so that it does not jam in the tube 5. In this way there is avoided the setting up of large stresses in the cluster as would occur if it were suddenly arrested, and the cluster is still available for withdrawal by the grab.

When the cluster has been withdrawn, thus reducing the weight loading on the device 1, the force exerted by the upwardly flowing coolant raises the part 3 until the point portions 11 of the hook members 9 are brought into contact with the face 8 of the member 4. The part 3 is thus latched to the part 4. The device 1 is handled through the member 17 and if it is desired to remove the device 1 (for example, so as to replace a tube 13 deformed by a fallen fuel cluster) a special tool is lowered down through the moderator structure, the tool having radially expansible latch members (remotely operated from above the reactor) which engage with the conical face 23 of the member 17. A large force is then applied in an upward dirsection to the device 1 through the tool. This force stresses the point portions 11 of the hook members 9 until they deform plastically and move inwardly over the face 8 and through the slots 12, thus releasing the parts 3, 4 from engagement with one another so that the assembly of the member 17, the tubes 13, 20 and 21, and the member 3 can then be withdrawn. The part 4 attached to the tube 5 remains undeformed and is thus available for re-use. In this way the channel 34 in the reactor is not rendered unusable.

The latch typically withstands a coolant force of 300 lbs. over a diameter of five inches and the hook members 9 deform plastically under a removal force of 500 lbs. The removal force which can be applied is limited by the need to avoid (by reaction through the tube 5) disturbance of the column 35.

The essential parts of one type of special tool are shown in FIGURES 5 to 7A. The tool is indicated generally by the reference numeral 60 and comprises a tubular head 61 fitted in the lower end of a casing 62. The head 61 has a bore 63 which locates a spindle 64 rotatable on ball bearings 65. The wall of the lower end 66 of the head 61 has three radially disposed apertures 67 locating three steel balls 68. The lower end 69 of the spindle 64 is fluted (as shown in FIGURE 7) to accommodate the inwardly-projecting parts of the balls 68. The material around the apertures 67 is peened over to prevent the balls 68 from falling out of the apertures.

A collar 70 embraces the head 61 with clearance so as to be slidable on the head 61. A compression spring 71 is disposed between a stepped portion 72 of the head 61 and the upper end face 70a of the collar 70. The lower end face 70b of the collar 70 is tapered as shown in FIGURE 5. To constrain the collar 70 to axial movement, the wall of the body 61 has a longitudinal slot 73 and the collar 70 is provided with a locating pin 74 projecting through the slot. The spindle 64 is provided with a circumferential groove 75 and a longitudinal groove 76 the upper end of which terminates at the groove 75. The collar 70 is shown with the pin 74 projecting through the lower end of the slot 73 to rest on the bottom of the groove 76. In this position, the spindle 64 is locked to the head 61 and is thus prevented from rotation relative thereto.

The tool 60 forms part of an assembly including an electric motor coupled to the spindle 64 through a gearbox and also including a television camera assembly.

To remove the device 1 from the reactor core the assembly is lowered down into the reactor until the lower end 66 of the head 61 enters the passageway 22 of the member 17 (FIGURE 1). Further lowering of the assembly results in the assembly being supported by the member 17 with the collar 70 being displaced upwardly, against the loading of the spring 71, by contact of the member 17 with the lower end face 70b of the collar 70. The weight of the assembly is sufficient to overcome the coolant-flow loading on the device 1.

Upward displacement of the collar 70 brings the pin 74 out of the longitudinal groove 76 and into the circumferential groove 75 thus allowing the spindle 64 to be rotated within the body 1.

The spindle 64 is then rotated so that the balls 68 are moved out of the fluted portions of the spindle and so that they project out of the apertures 67 (as shown in FIGURE 7A). The assembly is then withdrawn from the reactor core, the balls 68 latching on to the conical face 23 of the member 17 to withdraw the device 1 also and in the manner explained above.

We claim:

1. In a nuclear reactor cooled by fluid flow through the reactor core in an upward direction, a support structure defining an annular seat through which the reactor coolant flows, a hollow body disposed upright on said seat, a structure deformable by impact loading carried by said body and disposed to absorb energy by impact from above said body, at least one hook member depending from said body, said hook member being elastically deformable to engage with said seat and plastically deformable to disengage from said seat, means to permit elastic deformation of said hook member to engage the hook member with said seat, means to permit plastic deformation of said hook member to permit disengagement of said hook member from said seat, and means to prevent disengagement of said hook member from said seat by elastic deformation of said hook member.

2. In a nuclear reactor having a solid moderator mounted on a support structure and defining at least one vertically orientated coolant channel locating nuclear fuel cooled by a coolant fluid flowing upwardly through said channel; support means including an annular seat carried by said support structure and aligned with said channel, a hollow body disposed upright on said seat, a structure deformable by impact loading carried by said body and aligned with the channel so as to absorb energy by impact of a body falling through the channel, at least one hook member depending from said body, said hook member being elastically deformable to engage with said seat and plastically deformable to disengage from said seat, means to permit elastic deformation of said hook member to engage the hook member with said seat, means to permit plastic deformation of said hook member to permit disengagement of said hook member from said seat, and means to prevent disengagement of said hook member from said seat by elastic deformation of said hook member.

3. The combination of claim 1 wherein said structure deformable by impact loading comprises a tube collapsible along its length and having a preformed corrugated portion to assist collapse.

4. The combination of claim 3 wherein one end of the tube is attached to said body and the other end of the tube is attached to a tube handling member and further including means for withdrawing said body away from said seat comprising a tool member having a head part and incorporating a latch assembly engageable with said tube handling member.

5. In a nuclear reactor cooled by fluid flow through the reactor core in an upward direction, an energy dissipation device for absorbing energy by impact from above and disposed in a passage exposed to said upward coolant flow, latching means capable of holding the device against displacement out of the reactor core by said coolant flow, said means comprising at least one hook member depending from said device, said hook member being elastically deformable to engage with a stationary ring part in said passage and plastically deformable to disengage from said stationary part, means to permit elastic deformation of said hook member to engage the hook member with said stationary part, means to permit plastic deformation of said hook member to permit disengagement of said hook member from said stationary part and means to prevent disengagement of said hook member from said stationary part by elastic deformation of said hook member.

References Cited by the Examiner

UNITED STATES PATENTS

| | | | |
|---|---|---|---|
| 2,756,858 | 7/1956 | Kasschan | 176—87 |
| 2,870,871 | 1/1959 | Stevinson | 176—87 |

CARL D. QUARFORTH, *Primary Examiner.*

REUBEN EPSTEIN, *Examiner.*